(12) United States Patent
Berget et al.

(10) Patent No.: US 11,372,696 B2
(45) Date of Patent: Jun. 28, 2022

(54) SIRI REMINDERS FOUND IN APPS

(71) Applicant: Apple Inc., Cupertino, CA (US)

(72) Inventors: Erik Markus Berget, San Francisco, CA (US); Sofiane Toudji, San Francisco, CA (US); Zachary D. Maurer, Cupertino, CA (US); Antoine Vinel, Hauts-de-Seine (FR)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/426,565

(22) Filed: May 30, 2019

(65) Prior Publication Data

US 2020/0379822 A1    Dec. 3, 2020

(51) Int. Cl.
| | |
|---|---|
| *G06F 3/04842* | (2022.01) |
| *G06F 9/54* | (2006.01) |
| *G06F 9/451* | (2018.01) |
| *G06N 20/00* | (2019.01) |
| *H04L 51/224* | (2022.01) |
| *H04L 51/04* | (2022.01) |
| *G06F 40/20* | (2020.01) |

(52) U.S. Cl.
CPC .......... *G06F 9/542* (2013.01); *G06F 3/04842* (2013.01); *G06F 9/451* (2018.02); *G06F 40/20* (2020.01); *G06N 20/00* (2019.01); *H04L 51/04* (2013.01); *H04L 51/24* (2013.01)

(58) Field of Classification Search
CPC ......... H04L 67/22; H04L 51/34; H04L 51/24; H04L 51/32; H04L 51/04; G06F 9/542; G06F 9/451; G06F 40/20; G06F 3/04842; G06N 20/00

See application file for complete search history.

(56) References Cited

U.S. PATENT DOCUMENTS

| | | |
|---|---|---|
| 6,850,837 B2 | 2/2005 | Paulauskas et al. |
| 8,639,552 B1 | 1/2014 | Chen et al. |
| | (Continued) | |

FOREIGN PATENT DOCUMENTS

| | | |
|---|---|---|
| CN | 103093335 | 5/2013 |
| CN | 103440571 | 12/2013 |
| | (Continued) | |

OTHER PUBLICATIONS

Marilyn R McGee-Lennonet et al., Reminders that Make Sense: Designing Multimodal Notifications for the Home, May 1, 2011, IEEE Xplore, pp. 495-501 (Year: 2011).*

(Continued)

*Primary Examiner* — Tam T Tran
(74) *Attorney, Agent, or Firm* — Kilpatrick Townsend & Stockton LLP

(57) ABSTRACT

Embodiments of the present disclosure are directed to, among other things, generating reminders based on information from applications. For example, a first message may be received and a confirmation may be identified. Information that identifies an action to be performed and a trigger corresponding to the action can be detected from the first message and/or the confirmation. In some instances, a reminder may be generated based at least in part on the action and the trigger. An even corresponding to the trigger may then be detected, and the generated reminder may be presented based at least in part on the detection of the trigger.

20 Claims, 8 Drawing Sheets

(56) References Cited

U.S. PATENT DOCUMENTS

| | | |
|---|---|---|
| 8,812,958 B2 | 8/2014 | Willis et al. |
| 9,679,078 B2 | 6/2017 | Vora et al. |
| 9,876,751 B2 | 1/2018 | Spivack et al. |
| 9,922,169 B1 | 3/2018 | Candy |
| 10,447,723 B2 | 10/2019 | Miller |
| 10,671,947 B2 | 6/2020 | Nayar et al. |
| 11,064,068 B2 | 7/2021 | Bhullar |
| 2007/0111712 A1 | 5/2007 | Ratnakar |
| 2008/0169937 A1 | 7/2008 | Lowry |
| 2010/0184484 A1 | 7/2010 | Lindberg et al. |
| 2010/0273447 A1 | 10/2010 | Mann et al. |
| 2011/0145823 A1 | 6/2011 | Rowe et al. |
| 2011/0148632 A1 | 6/2011 | Chin |
| 2012/0129510 A1 | 5/2012 | Bradburn |
| 2013/0066944 A1 | 3/2013 | Laredo et al. |
| 2013/0217366 A1 | 8/2013 | Kolodziej |
| 2013/0226816 A1 | 8/2013 | Chory et al. |
| 2013/0329527 A1 | 12/2013 | Alavala et al. |
| 2014/0033071 A1* | 1/2014 | Gruber .................. G06F 3/0488 715/752 |
| 2014/0080106 A1 | 3/2014 | Falchuk et al. |
| 2014/0081691 A1 | 3/2014 | Wendell |
| 2014/0297743 A1 | 10/2014 | Zyto et al. |
| 2014/0297758 A1 | 10/2014 | Kidron et al. |
| 2014/0335490 A1 | 11/2014 | Baarman et al. |
| 2014/0372896 A1 | 12/2014 | Raman |
| 2015/0033138 A1 | 1/2015 | Manchanda |
| 2015/0127565 A1 | 5/2015 | Chevalier et al. |
| 2015/0143281 A1 | 5/2015 | Mehta et al. |
| 2015/0187201 A1 | 7/2015 | Yuksel et al. |
| 2015/0193392 A1* | 7/2015 | Greenblatt ........... G06Q 10/109 715/205 |
| 2015/0207926 A1 | 7/2015 | Brown et al. |
| 2015/0236598 A1 | 8/2015 | Krueger et al. |
| 2015/0241903 A1 | 8/2015 | Sonmez |
| 2015/0341903 A1 | 11/2015 | Jeong et al. |
| 2016/0094979 A1 | 3/2016 | Naik et al. |
| 2016/0110012 A1 | 4/2016 | Yim et al. |
| 2016/0224946 A1 | 8/2016 | Vemuri et al. |
| 2016/0300178 A1 | 10/2016 | Perry et al. |
| 2016/0337295 A1* | 11/2016 | Bennett ................. H04L 51/046 |
| 2016/0345132 A1 | 11/2016 | Creighton et al. |
| 2016/0349953 A1 | 12/2016 | Adler et al. |
| 2016/0360382 A1 | 12/2016 | Gross et al. |
| 2017/0004396 A1* | 1/2017 | Ghotbi .................. G06N 3/006 |
| 2017/0091717 A1* | 3/2017 | Chandraghatgi ....... H04L 67/36 |
| 2017/0118348 A1 | 4/2017 | Dotan-Cohen et al. |
| 2017/0178048 A1 | 6/2017 | Ghotbi et al. |
| 2017/0243465 A1 | 8/2017 | Bourne, Jr. et al. |
| 2017/0286913 A1 | 10/2017 | Liu et al. |
| 2017/0308866 A1 | 10/2017 | Dotan-Cohen et al. |
| 2017/0346914 A1 | 11/2017 | Cheung et al. |
| 2018/0144154 A1* | 5/2018 | Shacham ............ H04L 63/0428 |
| 2018/0233133 A1* | 8/2018 | Hilal ...................... G10L 15/22 |
| 2018/0336530 A1 | 11/2018 | Johnson et al. |
| 2019/0020991 A1 | 1/2019 | Hamilton et al. |
| 2019/0095846 A1 | 3/2019 | Gupta et al. |
| 2019/0129749 A1 | 5/2019 | White et al. |
| 2019/0220010 A1 | 7/2019 | Leonard et al. |
| 2020/0005248 A1 | 1/2020 | Gerzi et al. |
| 2020/0302404 A1* | 9/2020 | Shaya .................... G06Q 10/10 |

FOREIGN PATENT DOCUMENTS

| | | |
|---|---|---|
| CN | 107147810 | 9/2017 |
| CN | 107230045 | 10/2017 |
| CN | 107636647 | 1/2018 |
| CN | 107846508 | 3/2018 |

OTHER PUBLICATIONS

Chi-Yi Lin et al., A Location-based Personal Task Management Application for Indoor and Outdoor Environments, Sep. 1, 2012, IEEE Xplore, pp. 582-587 (Year: 2012).*

Bozzon, Alessandro et al., "Choosing the Right Crowd: Expert Finding in Social Networks." *EDBT/ICDT* '13, Mar. 18-22, 2013, Genoa, Italy. Copyright 2013 ACM 978-1-4503-1597—May 13, 2003. 12 pages.

U.S. Appl. No. 16/788,995, Notice of Allowance, dated Jan. 8, 2021, 10 pages.

U.S. Appl. No. 16/789,080, Non-Final Office Action, dated Jan. 6, 2021, 14 pages.

U.S. Appl. No. 16/015,076, Final Office Action, dated Mar. 10, 2021, 41 pages.

U.S. Appl. No. 16/788,995, Notice of Allowance, dated Mar. 8, 2021, 11 pages.

China Patent Application No. CN202010473063.4, Office Action, dated Feb. 24, 2021, 15 pages.

U.S. Appl. No. 16/789,080, Final Office Action, dated Jul. 1, 2021, 16 pages.

U.S. Appl. No. 16/015,076, Non-Final Office Action, dated Aug. 16, 2021, 38 pages.

U.S. Appl. No. 16/789,080, Non-Final Office Action, dated Mar. 15, 2022, 17 pages.

International Patent Application No. CN202010473063.4, Notice of Decision to Grant, dated Apr. 22, 2022, 4 pages.

* cited by examiner

SIRI REMINDERS FOUND IN APPS

BACKGROUND

Users of today's mobile devices rely on those devices to perform a myriad of time-saving and organization tasks. While the primary purpose of a mobile phone, historically, was to place calls to others and, and later, to send electronic messages, today's phones are expected to do much more. Most mobile devices today can manage a user's calendar, provide driving directions, and even remind a user to perform real world activities that the user may have otherwise forgotten to do. For example, some activities and/or events may not be appropriate for a user's calendar. Additionally, user's may lose track of information that could help them remember to perform various tasks. Thus, various challenges exist with mobile phones when it comes to reminding users about activities.

BRIEF SUMMARY

Embodiments of the present disclosure can provide systems, methods, and computer-readable medium for generating reminders based at least in part on information identified in device applications.

In some embodiments, a computer-implemented method is disclosed. The method may comprise receiving, by a computing device, first textual information from a second computing device. The method may comprise determining, by the computing device, that the first textual information identifies a physical object and an action to be performed on the physical object. The method may comprise receiving, by the computing device, second textual information that is a response to the first textual information. The method may comprise determining, by the computing device, whether the response identifies a confirmation of the action to be performed on the physical object. The method may comprise identifying, by the computing device, whether the first textual information or the second textual information identifies a trigger comprising at least one of a time or a location. The method may comprise, in accordance with a determination that the confirmation and the trigger were validated: generating, by the computing device, a reminder object corresponding to action to be performed; presenting, by the computing device, a reminder selection user interface element corresponding to the reminder object; and in accordance with a determination that the reminder selection user interface element was selected, presenting, by the computing device, a reminder notification that represents the reminder object upon detection of an event.

In some embodiments, the event comprises at least one of occurrence of the time, the computing device leaving the location, the computing device determining that a user is leaving the location, the computing device arriving at the location or the computing device determining that a user is arriving at the location.

In some embodiments, the method may comprise generating a title for the reminder object based at least in part on at least one of the physical object, the action, or the trigger, and wherein at least one of the notification or the reminder notification includes the title. The method may comprise in accordance with a determination that the reminder selection user interface was not selected: presenting the reminder selection user interface element in at least one of a reminders user interface or based at least in part on a determined time, detection of the computing device leaving a location, detection of the computing device arriving at the location, or detection of the computing device being within a threshold distance of the second computing device. In some embodiments, the validation of the confirmation and the trigger comprises executing a decision engine to determine a confidence score for accuracy of the confirmation and the trigger.

In some embodiments, the confirmation, the trigger, the physical object, and the action are determined based at least in part on a machine learning model configured to analyze the first textual information and the second textual information. In some embodiments, the first textual information is associated with a first account that corresponds to the second device. In some embodiments, the second textual information is received via an input device of the computing device and is associated with a second account that corresponds to the user.

In some embodiments, a user device is disclosed. The user device may comprise a memory configured to store computer-executable instructions and a processor configured to access the memory and execute the computer-executable instructions to perform operations. The operations may comprise receiving a first message from a second device, identifying a confirmation of the first message at the user device, detecting, from at least one of the first message or the second message, information that the identifies an action to be performed and a trigger corresponding to the action, generating a reminder to be presented to a user of the user device based at least in part on the action and the trigger, detecting an event corresponding to the trigger, and presenting, on a display of the user device, the generated reminder corresponding to the action based at least in part on detection of the trigger.

In some embodiments, the processor is further configured to execute the computer-executable instructions to at least present, on a user interface of the display, an acceptance prompt configured to enable the user to accept the generated reminder. In some embodiments, the processor is further configured to execute the computer-executable instructions to at least receive selection of an acceptance of the reminder via the acceptance prompt, and wherein the detection of the event and the presentation of the reminder are based at least in part on the selection of the acceptance prompt. In some embodiments, the processor is further configured to execute the computer-executable instructions to at least present a second acceptance prompt in a second user interface of the display based at least in part on the user not accepting the acceptance prompt, and wherein the second interface comprises a plurality of other reminders. In some embodiments, the detection of the event and the presentation of the reminder are based at least in part on the selection of the second acceptance prompt. In some embodiments, the plurality of other reminders comprise other unaccepted reminders. In some embodiments, the first message identifies an object upon which the action is to be performed and/or the trigger identifies a time and date, an arrival location for the user device, or a departure location for the user device.

In some embodiments, a computer-readable storage medium is disclosed. The computer-readable storage medium may store computer-executable instructions that, when executed by one or more processors of a user device, configure the one or more processors to perform operations. The operations may comprise receiving, by the user device, text of a digital conversation that identifies an object, an action to be performed on the object, and a trigger corresponding to the object and the action. The operations may further comprise determining, based at least in part on the text, that at least a portion of the digital conversation comprises a confirmation. The operations may further comprise generating a reminder to be presented to a user of the user device based at least in part on the action and the trigger. The operations may further comprise detecting an event corresponding to the trigger. In some embodiments, the operations may further comprise presenting, on a display of the user device, the generated reminder corresponding to the action based at least in part on detection of the trigger.

In some embodiments, the reminder is generated based at least in part on the action being identified on a whitelist of verbs. In some embodiments, the digital conversation is received via a messaging application of the user device. In some embodiments, the confirmation is determined by processing the text of the digital conversation using a machine learning model.

BRIEF DESCRIPTION OF THE DRAWINGS

Various embodiments in accordance with the present disclosure will be described with reference to the drawings, in which.

DETAILED DESCRIPTION

Figure 1:
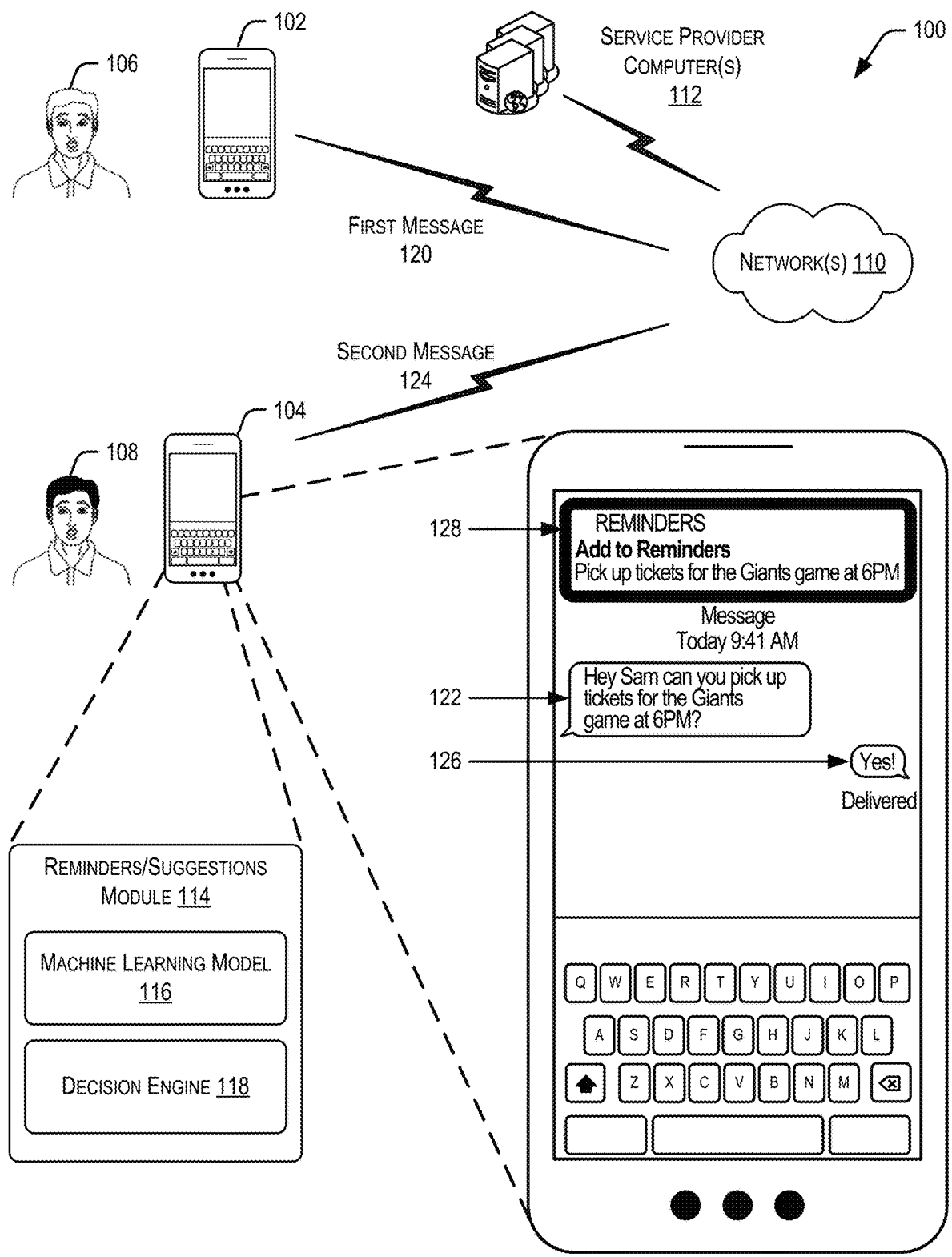
FIG. 1 illustrates an example environment for generating reminders based at least in part on information identified in device applications, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, generating reminders based at least in part on information identified in device applications. In some examples, reminders may remind a user about a task or action to be performed on an object (e.g., a physical object, a virtual object, or the like). As used herein, a "task" or "action" may include any suitable activity to be performed by a user. Additionally, "reminders" may include any suitable electronic delivery mechanism in any suitable form (e.g., alarms, alerts, emails, notifications (e.g., push), badges, etc.). The examples and contexts of such examples provided herein are intended for illustrative purposes and not to limit the scope of this disclosure.

In some embodiments, a first user may access an application (hereinafter, "app") of an electronic device (e.g., the first user's device such as a smartphone, laptop, or the like). The app may be a messaging app (e.g., for sending/receiving text messages, instant message, etc.) or any other type of app with which multiple users can communicate (e.g., an app that manages telephone conversations between users). Using the application, the first user may communicate with one or more other users (e.g., a text conversation). As part of the communication, one of the other users may ask the first user to perform an action (e.g., on an object). If the first user confirms that they will perform the action, via the app, a reminder and/or a reminder suggestion (e.g., a reminder selection user interface element) can be generated. The reminder suggestion can be accepted and/or the reminder itself can be configured by the user. The reminder suggestion can also be ignored or otherwise dismissed, in which case, the suggestion may be presented at a later time. In any event, the user can be reminded of the action, object, and/or trigger by presentation of a notification (e.g., a reminder user interface element). The reminder may be prompted by a trigger that was identified in the conversation. Additionally, information from other communication apps can be utilized to generate the reminders and/or the reminder suggestion.

As one example, a first user may utilize a user interface provided as part of an application operating on their electronic device (e.g., a smartphone). Within the user interface, the first user may be in communication with another user. As part of the conversation, the other user may ask the first user a question about performing an action on an object. For example, the other user may ask the first user to "buy milk," and the first user may response "ok," signifying that they will do it. According to embodiments described herein, a reminder (e.g., a reminder object) can be generated based on a combination of at least the question followed by the confirmation. The reminder itself may eventually trigger a notification at an appropriate time/location. Additionally, a reminder suggestion may be generated (e.g., in the form of a user interface element), and the reminder suggestion may be presented to the first user for acceptance or dismissal. In some examples, the trigger may be detected in the confirmation (e.g., if the reminder statement is "can you buy some milk," and the response is "I'll grab some this evening" or "I'll pick up some when I leave work").

In some examples, the reminder and/or reminder suggestion may be generated based on various parameters of the conversation. For example, the reminder and/or reminder suggestion may be generated based solely on the initial question from the other user, based on the question and the confirmation, and/or based on a trigger being identified. In some cases, a trigger may include a day and/or time, an arrival location, or a departure location. Locations that can be supported include "home," "work," "school," or other locations of interest (LOI). LOIs can include any location that has been saved to a user's account or is regularly visited by the user (e.g., if a user regularly shops at a particular grocery store, that store (and/or location) may be saved as an LOI for that user). The more parameters that are required, the greater likelihood that the reminder will be appropriately accurate. Thus, in one implementation, the following parameters may be required in order for the reminder and/or suggestion to be generated: a question, a confirmation, and a trigger. In this specific example, without all three of these, no reminder will be generated. It should be appreciated that any of the previous or following functionality may be provided by the user device itself, by a server computer in communication with the user device, or any suitable combination of the two.

Once a reminder has been generated and accepted, a notification (e.g., a reminder user interface element) can be presented to the user to remind them to perform the action. The reminder may be presented based at least in part on detection of the trigger that was detected in the conversation. For example, if the above example conversation identified a time or a location, occurrence of the time, or arrival at/departure from the location would trigger the reminder. For example, if the other user asked the first user "can you buy some milk after you leave work," the notification (e.g., the reminder) would be triggered when the first user departed from their work location. In this case, the occurrence of the first user departing from work would be the trigger.

Such concepts will be discussed further below with respect to at least FIGS. 1-8.

FIG. 1 illustrates an example environment 100 for generating reminders based at least in part on information identified in device applications, in accordance with at least one embodiment. In some examples, one or more user devices (e.g., mobile device 102 and mobile device 104) may be controlled by one or more respective users (e.g., user 106 and user 108) that communicate with one another over one or more networks 110. In some examples, the communication signals over the networks 110 can be managed (e.g., received, processed, and/or sent) by one or more service provider computers 112 (e.g., a cellular service or an Internet Service Provider (ISP)). Additionally, although most of the embodiment and functionality disclosed herein is described with reference to processing being performed on the one or more user devices, any and/or all of the processing could instead be performed by the one or more service provider computers 112.

In some examples, user device 104 may be configured with a reminders/suggestions module 114. The reminders/suggestions module 114 can be part of the Operating System (OS) of the user device 104, or it can be a stand-alone application. In either case, the reminders/suggestions module 114 can be configured to implement one or more software modules for generating reminders based at least in part on information identified in device applications. As will be described in further details, the reminders/suggestions module 114 can implement a machine learning module 116 and/or a decision engine 118. The machine learning module 116 may be configured to detect and/or infer certain properties from within the conversation between user 106 and user 108, and it may be able to make recommendations regarding the potential reminder. The output of the machine learning module 116 may be processed by the decision engine 118 in order to validate the properties and make the determination regarding whether to generate the reminder. If the decision engine 118 validates the properties, and determines that a reminder should be generated, the decision engine 118 can also generate the reminder and/or the reminder suggestion. However, in some examples, a separate suggestion module may be responsible for the reminder suggestion once the decision engine 118 generates the reminder (e.g., a reminder object).

In at least one specific example, user 106 may prepare and send a first message 120 to user device 104 over the networks 110. A messaging application of user device 104 can present the first message 120 at 122 on a User Interface (UI). In response to this message, user 108 can respond with a second message 124. The second message 124 can be sent over the networks 110 for display by user device 102; however, at the substantially the same time, it can be displayed in the UI at 126. In this example, the first message 120 was "Hey Sam can you pick up tickets for the Giants game at 6 pm?" In response, the second message 124 was "Yes!" As will be discussed in more detail below, this conversation includes a) a question (e.g., "can you pick up tickets"), b) an object (e.g., "tickets"), c) an action (e.g., "pick up"), d) a trigger (e.g., "at 6 pm"), and e) a confirmation (e.g., "Yes!"). In some examples, each of these elements may be required in order to generate a reminder. Based at least in part on the output of the machine learning model 116 and the decision engine 118, a reminder suggestion 128 may be generated and presented on the UI for the user to accept or dismiss. In this case, the reminder suggestion 128 states the title of the reminder "Pick up tickets for the Giants game at 6 PM" with the suggestion of "Add to Reminders." Depending on whether the user accepts or dismisses the reminder suggestion 128, the reminders/suggestions module 114 can either store a reminder, and notify the user at 6 pm, or store the reminder suggestion 128, to present to the user at a later time (e.g., when user 106 and user 108 are communicating again and/or when user 106 and user 108 are physically near one another).

Figure 2:
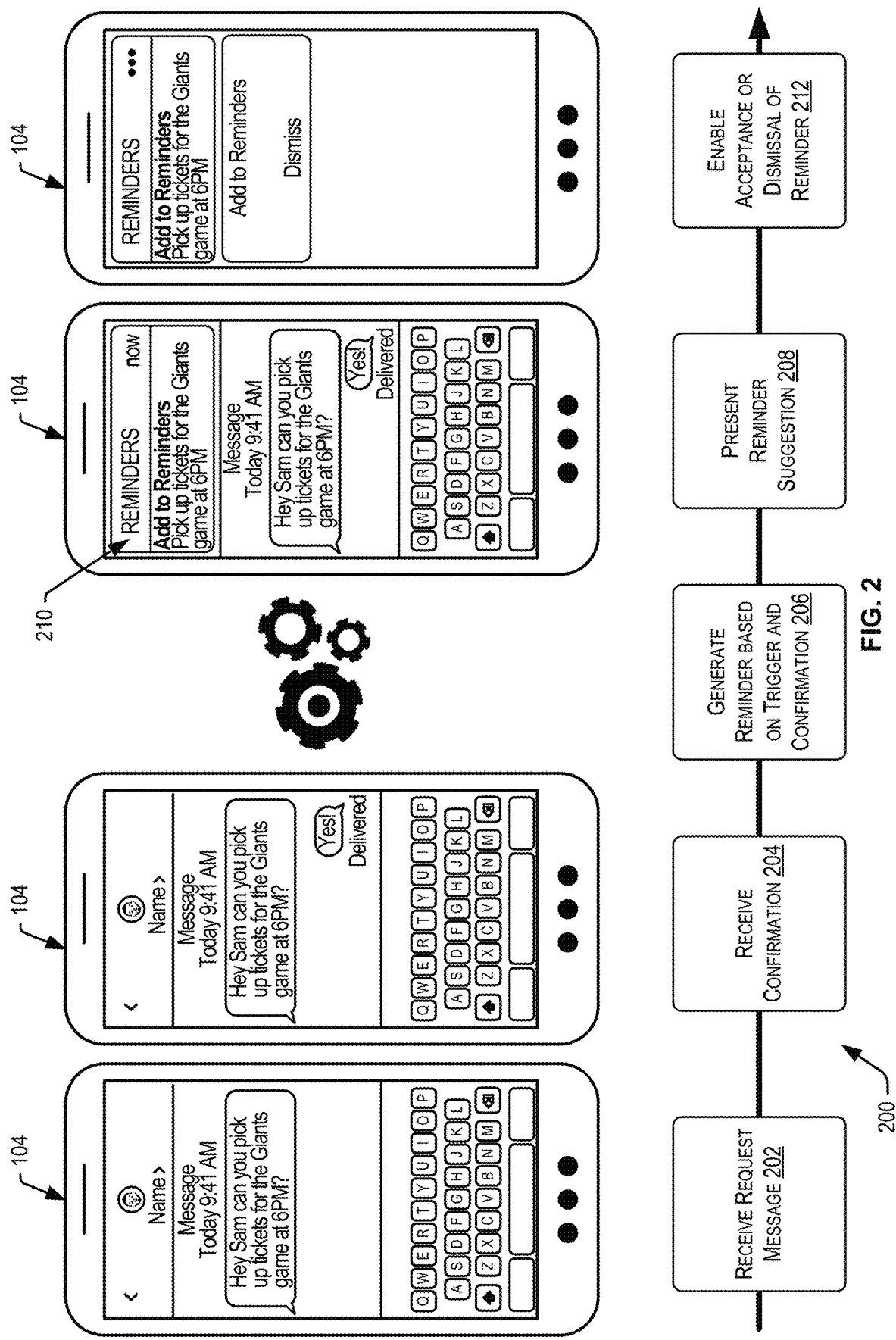
FIG. 2 illustrates an example flow for generating reminders based at least in part on information identified in device applications, in accordance with at least one embodiment.

FIG. 2 is an example flow 200 for implementing reminder generation techniques, in accordance with at least one embodiment where the trigger for performing the action on the object is a date/time. It should be appreciated that the flow 200 may include a greater number or a lesser number of operations than those depicted in FIG. 2 and that operations (e.g., the operations depicted in FIG. 2) may be performed in any suitable order. The operations of flow 200 may be performed by the user device 104 of FIG. 1 or a server computer configured to provide such functionality (e.g., service provider computers 112 of FIG. 1), or any suitable combination of the two.

The flow 200 may begin at 202, where user device 104 can receive a message that includes a request (e.g., a question) for the user of user device 104 to perform an action on an object. In this example, the request is "Hey Sam can you pick up tickets for the Giants game at 6 PM?" In this request, the object is "tickets," and the action is "pick up." Additionally, while not all requests may include a trigger, this request include a trigger, indicating that the action is to be taken at "6 PM." Thus, if a reminder is to be provided to the user, the reminder should be at 6 PM or at least at some time before 6 PM, for example one hour before or the like. At 204, the user device 104 may be configured to receive a confirmation, in this example, the user has responded "Yes!" Not all responses will be confirmations, for example, if the user responded "no," or "I can't," or anything that did not affirmatively confirm agreement or acceptance of the request. Further, the disclosed techniques may be capable of determining a confirmation regardless of the type of confirmatory language used. For example, "sure," "ok," "got it," "will do," or even an emoji such as an image that illustrates an extended thumb ("thumbs up") or the like. In some examples, the machine learning model 116 and/or the decision engine 118 of FIG. 1 may be able to determine whether the response is a confirmation.

Based at least in part on receipt of a request and a confirmation, the user device 104 may generate a reminder at 206, and the reminder may be based at least in part on the trigger and the confirmation. For example, in some instances, a trigger and a confirmation may be minimum requirements for generation of a reminder. In this way, the system can be fairly certain that a reminder would be helpful and not an annoyance. Additionally, requiring a minimum set of parameters in order to generate a reminder can be reduce the number of processing cycles require and/or increase the batter life of the user device 104; otherwise, too many reminders (e.g., redundant and/or unneeded reminders) may be generated. While not illustrated in FIG. 2, the user device 104 may also generate a title for the reminder at 206. In this example, because the trigger was detected to be a time, that time will be listed in the title of the reminder. At 208, a reminder suggestion 210 that includes the title of the reminder can be presented in the UI. The title of the reminder suggestion 210 includes the object, the action, and the trigger. In some instances, the trigger may be a time, and the system may assume that the time is for the current day. However, if the request includes a date, alone or along with a time, the system will set the trigger to be the time that corresponds to the date in the request, or simply to the date (e.g., first thing in the morning, once the user wakes up that day, etc.). Additionally, in some examples, the trigger may not be part of the request, but may instead be part of the replay. For example, if the request was "Hey Sam can you pick up tickets for the Giants game," and the response was "sure, I'll do it at 6 PM," then the same reminder would be generated at 206. Further, in some examples, the request or the response may indicate that the trigger is a generic time of day (e.g., morning, afternoon, evening, night, etc.). In this case, the system can infer a time for the reminder and/or the reminder suggestion 210, and the user can revise the suggested time after accepting the reminder.

At 212, if the user selects the reminder suggestion 210, the reminder suggestion UI element may change to present a select/dismiss UI element that enables the user to accept or dismiss the reminder suggestion 210. In some examples, the user may also be able to configure the reminder (e.g., the reminder object) once the reminder suggestion 210 is accepted. In this way, the user could indicate how early, before the trigger occurs, the reminder notification should be provided (e.g., whether the notification should be provided at the trigger time (6 pm here), or some time before the trigger time (e.g., 10 minutes, 30 minutes, 60 minutes, etc.). In other examples, this may be configured automatically based on the user's location and the current time. For example, if the user is in a location that is one hour away from the object (e.g., the Giant's ticket off in this case), the notification may automatically be presented one hour before the trigger time, thus giving the user ample time to get to the location to perform the action on time. Once accepted, the reminder may be stored, and accessible via a reminders UI, where other accepted reminders may be presented. In the reminders UI, the accepted reminders may be canceled or further configured. Once accepted and/or configured, the reminder may be presented to the user based at least in part on occurrence of the trigger.

Alternatively, if the user dismisses the reminder suggestion 210, the reminder object may still be stored, but it may only be accessible in a reminder suggestions UI, or in another part of the reminders UI that doesn't list the accepted reminders. Additionally, in some examples, if the reminder suggestion 210 is dismissed, the system may be configured to provide the reminder suggestion 210 again, at least until occurrence of the trigger or subsequent acceptance. In this way, if the user intended to accept the reminder, but forgot or selected the wrong option on the selection UI, they will have another chance to accept. Thus, there are various opportunities for the user to accept the reminder (e.g., a pending reminder suggestion), other than just via the reminder suggestion 210 of FIG. 2. For example, if the user is communicating with (or physically near) the user that sent the initial request, the reminder suggestion 210 may be presented again (or only then). In another example, the reminder suggestion 210 may be presented when the user is accessing a website that is capable of selling tickets to the Giants game, when the user is near the stadium, and/or when the user is talking to someone else about the Giants game. Thus, parties (e.g., other users), objects, locations, times, etc., can all be secondary triggers that are used to prompt the system to provide the reminder suggestion 210 either for the first time, or for a second time if the reminder suggestion 210 was not accepted the first time.

Figure 3:
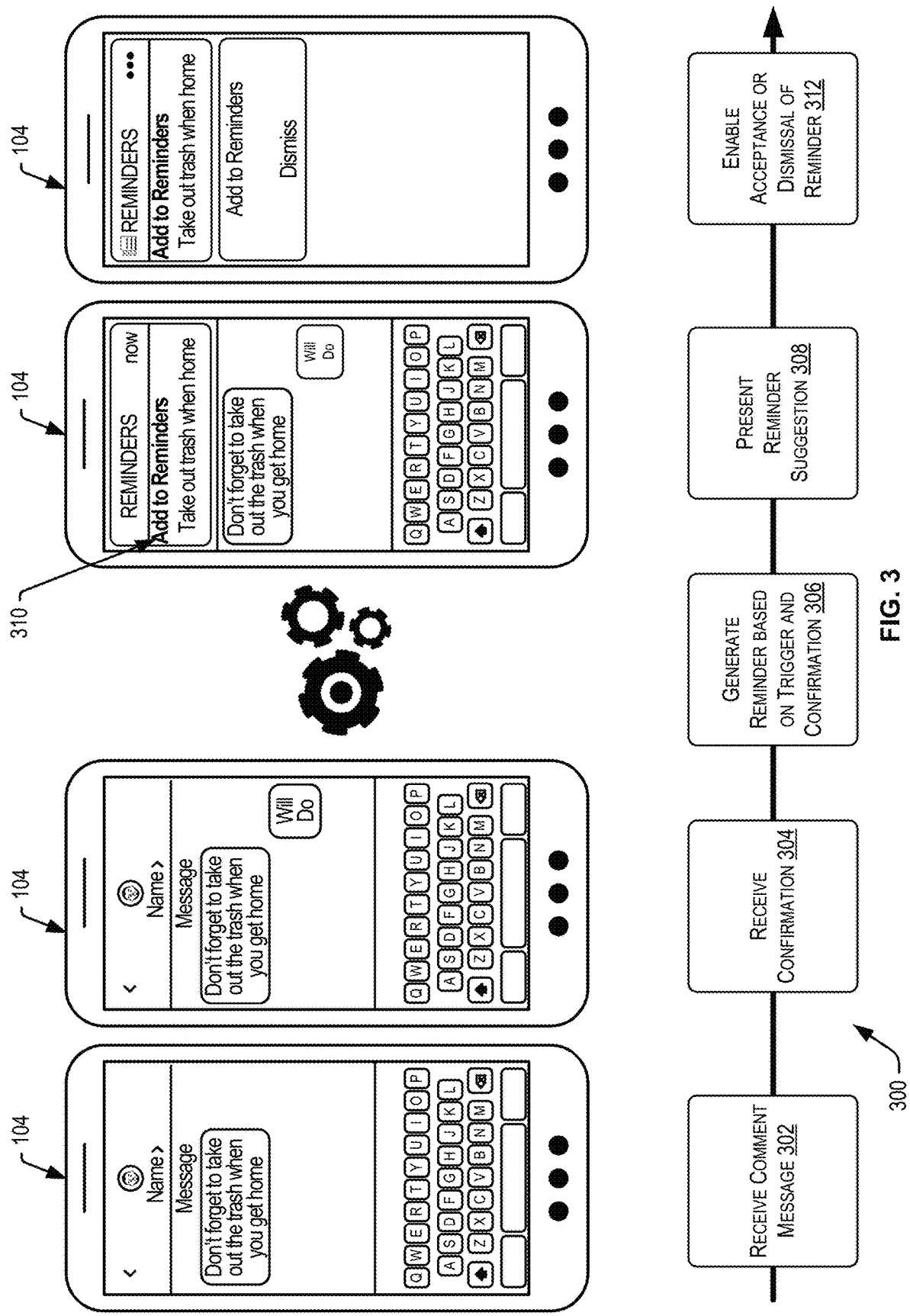
FIG. 3 illustrates another example flow for generating reminders based at least in part on information identified in device applications, in accordance with at least one embodiment.

FIG. 3 is an example flow 300, similar to flow 200 of FIG. 2, for implementing reminder generation techniques, in accordance with at least one embodiment. However, in this example, the message is a comment as opposed to a request and the trigger for performing the action on the object is an arrival location as opposed to a time. Similar to flow 200, it should be appreciated that the flow 300 may include a greater number or a lesser number of operations than those depicted in FIG. 3 and that operations (e.g., the operations depicted in FIG. 3) may be performed in any suitable order. The operations of flow 300 may be performed by the user device 104 of FIG. 1 or a server computer configured to provide such functionality (e.g., service provider computers 112 of FIG. 1), or any suitable combination of the two.

The flow 300 may begin at 302, where user device 104 can receive a message that includes a comment for and/or about the user of user device 104 to perform an action on an object. In this example, the message is "Don't forget to take out the trash when you get home." In this message, the object is "trash," and the action is "take out." Additionally, in this case, the trigger is the location "home." Because the trigger is a location, the system will need to determine whether it's an arrival location or a departure location. Here, because the comment stated "when you get . . . ," it's an arrival location. Thus, if a reminder is to be provided to the user, the reminder notification should be provided when the location of the user device 104 matches that of the user's home. At 304, the user device 104 may receive a confirmation, in this example, the user has responded "Will Do." As noted, not all responses will be confirmations.

Based at least in part on receipt of the comment and a confirmation, the user device 104 may generate a reminder at 306, and the reminder may be based at least in part on the trigger and the confirmation. Similar to in FIG. 1, the user device 104 may also generate a title for the reminder at 306. In this example, because the trigger was detected to be a location, that location will be listed in the title of the reminder. At 308, a reminder suggestion 310 that includes the title of the reminder can be presented in the UI. The title of the reminder suggestion 310 includes the object, the action, and the trigger.

At 312, if the user selects the reminder suggestion 310, the reminder suggestion UI element may change to present a select/dismiss UI element that enables the user to accept or dismiss the reminder suggestion 310. In some examples, the user may also be able to configure the reminder (e.g., the reminder object) once the reminder suggestion 310 is accepted. In this way, the user could indicate how early, before the trigger, the reminder notification should be provided (e.g., whether the notification should be provided at the trigger location ("home" in this case), or some time before occurrence of the trigger (e.g., some time or distance from home, based on the user's location and estimated travel times). In other examples, this may be configured automatically based on the user's location and the current time. For example, if the user is in a location that is one hour away from the location (e.g., "home" in this case), the notification may automatically be presented one hour before the occurrence of the trigger, thus giving the user a reminder a little before they actually arrive at the location. Once accepted, the reminder may be stored, and accessible via a reminders UI, where other accepted reminders may be presented. In the reminders UI, the accepted reminders may be canceled or further configured. Once accepted and/or configured, the reminder may be presented to the user based at least in part on occurrence of the trigger.

Alternatively, if the user dismisses the reminder suggestion 310, the reminder object may still be stored, but it may only be accessible in a reminder suggestions UI, or in another part of the reminders UI that doesn't list the accepted reminders. Additionally, in some examples, if the reminder suggestion 310 is dismissed, the system may be configured to provide the reminder suggestion 310 again, at least until occurrence of the trigger or subsequent acceptance. In this way, if the user intended to accept the reminder, but forgot, or selected the wrong option on the selection UI, they will have another chance to accept. Thus, there are various opportunities for the user to accept the reminder, other than just via the reminder suggestion 310 of FIG. 3. For example, if the user is communicating with (or physically near) the user that sent the initial message, the reminder suggestion 310 may be presented again (or only then).

Figure 4:
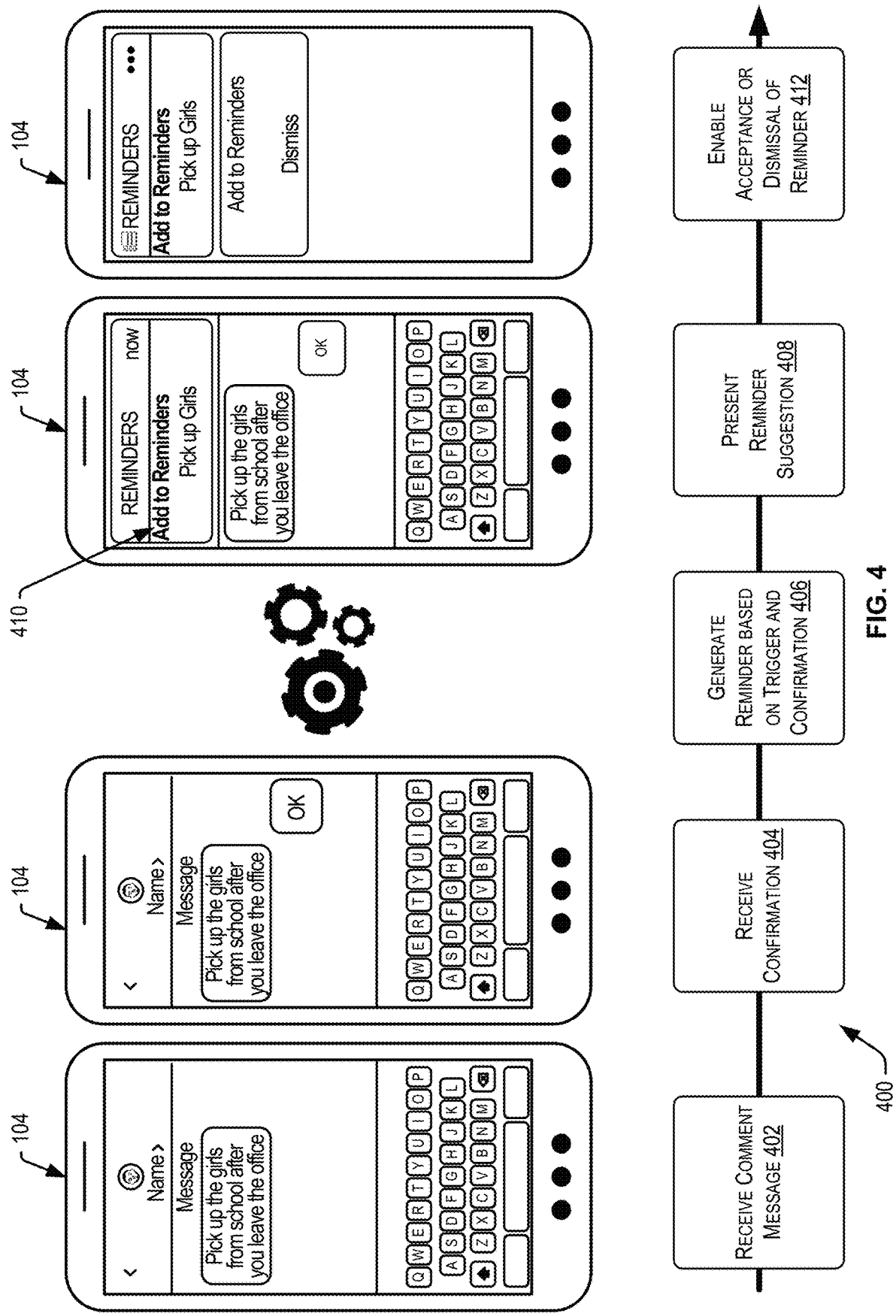
FIG. 4 illustrates another example flow for generating reminders based at least in part on information identified in device applications, in accordance with at least one embodiment.

FIG. 4 is an example flow 400, similar to flow 200 of FIG. 2 and flow 300 of FIG. 3, for implementing reminder generation techniques, in accordance with at least one embodiment. However, in this example, the trigger for performing the action on the object is a departure location. Similar to flow 200 and flow 300, it should be appreciated that the flow 400 may include a greater number or a lesser number of operations than those depicted in FIG. 4 and that operations (e.g., the operations depicted in FIG. 4) may be performed in any suitable order. The operations of flow 400 may be performed by the user device 104 of FIG. 1 or a server computer configured to provide such functionality (e.g., service provider computers 112 of FIG. 1), or any suitable combination of the two.

The flow 400 may begin at 402, where user device 104 can receive a message that includes a comment for and/or about the user of user device 104 to perform an action on an object. In this example, the message is "Pick up the girls from school after you leave the office." In this message, the object is "girls," and the action is "pick." Additionally, in this case, the trigger is the location "office." Because the trigger is a location, the system will need to determine whether it's an arrival location or a departure location. Here, because the comment stated "after you leave . . . ," it's a departure location. Thus, if a reminder is to be provided to the user, the reminder notification should be provided when the location of the user device 104 no longer matches that of the user's office/work location, or when the user device 104 determines that the location of the user no longer matches that of the user's office/work location (e.g., the user device 104 may be able to detect that the user was at their office, but no longer is, based on geolocation capabilities of the user device 104, or by communicating with another wearable device worn by the user). At 404, the user device 104 may receive a confirmation, in this example, the user has responded "OK." As noted, not all responses will be confirmations; however, the system can detect every possible confirmatory response.

Based at least in part on receipt of the comment and the confirmation, the user device 104 may generate a reminder at 406, and the reminder may be based at least in part on the trigger and the confirmation. Similar to in FIGS. 1 and 2, the user device 104 may also generate a title for the reminder at 406. In this example, because the trigger was detected to be a location, that location will be listed in the title of the reminder. At 408, a reminder suggestion 410 that includes the title of the reminder can be presented in the UI. The title of the reminder suggestion 410 includes the object, the action, and the trigger.

At 412, if the user selects the reminder suggestion 410, the reminder suggestion UI element may change to present a select/dismiss UI element that enables the user to accept or dismiss the reminder suggestion 410. In some examples, the user may also be able to configure the reminder (e.g., the reminder object) once the reminder suggestion 410 is accepted. In this way, the user could indicate how early, before the trigger occurs, the reminder notification should be provided (e.g., whether the notification should be provided when the user is determined to be at the trigger location ("work" in this case), or some time after occurrence of the trigger (e.g., some time or distance from the office, based on the user's location and estimated travel times). Once accepted, the reminder may be stored, and accessible via a reminders UI, where other accepted reminders may be presented. In the reminders UI, the accepted reminders may be canceled or further configured. Once accepted and/or configured, the reminder may be presented to the user based at least in part on occurrence of the trigger.

Figure 5:
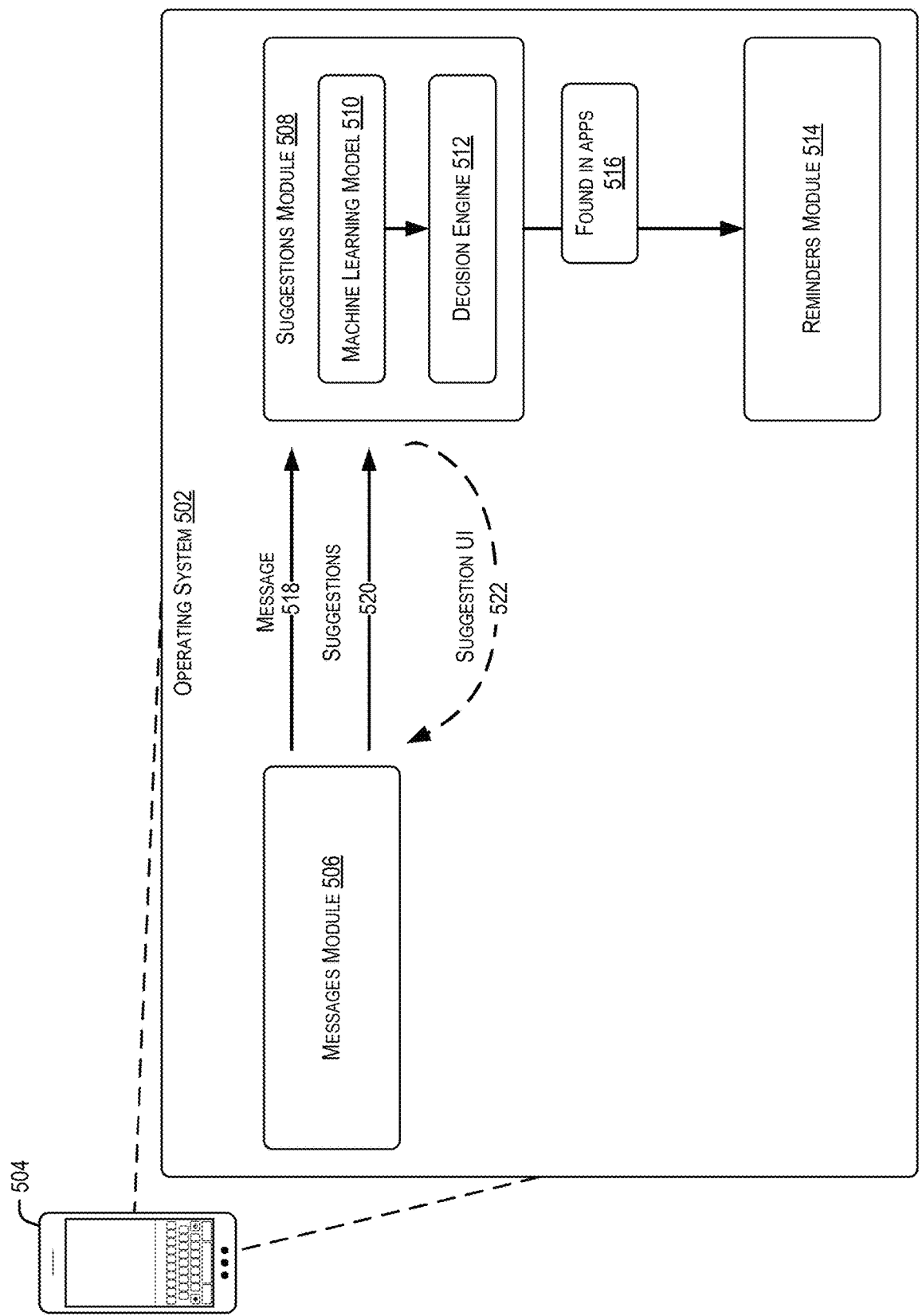
FIG. 5 illustrates an example architecture of a device configured to generate reminders based at least in part on information identified in device applications, in accordance with at least one embodiment.

FIG. 5 illustrates an example architecture 500 for generating reminders based at least in part on information identified in device applications, in accordance with at least one embodiment. In some examples, a main process (e.g., the OS 502) of a user device 504 can be configured to implement one or more software modules, e.g., a messages module 506, a suggestions module 508, and a reminders module 510. In at least one instance, the messages module 506 is configured to receive and/or process messages (e.g., text messages, email messages, instant messages, etc.), as well as render/present them on the screen of the user device 504. Additionally, the messages module 506 can provide the messages to the suggestions module 508 as illustrated by arrow 518. In some examples, every message that is received by the messages module 506 is sent to the suggestions module 508. The suggestions module 508 can process the payloads of the incoming messages to determine if a reminder should be suggested. Thus, the suggestions module 508 can, in some instances, implement a machine learning model 510 (e.g., the machine learning model 116 of FIG. 1) and a decision engine 512 (e.g., the decision engine 118 of FIG. 1).

In some examples, the reminders module 514 is responsible for managing generated reminders, suggested reminders, and accepted reminders. As such, the reminders module 514 may merely store the reminder instances and present in a reminders UI. Instead, the suggestions module 508 can be responsible for generating the reminder suggestions and the reminder objects, and may also be responsible for generating the UI elements for presenting both the reminder suggestions and the reminder alerts (e.g., notifications). The suggestions module 508 can call one or more Application Program Interfaces (APIs) to the reminders module 514 in order to have one or more UI elements prepared, when desired.

When one or more messages are received by the messages module 506, the messages module 506 can make an API call to the suggestions module 508, that includes the message payload. If the suggestions module 508 finds a reminder, the reminder object can be written to the reminders module 514 by including it a "found in apps" 516 list (e.g., the generated reminder can be tagged with "found in apps"). For each conversation thread (e.g., between the user of the user device 504 and any other individual (or group of) user(s)), there can be a single buffer of messages. So, for a single conversation, there will be a single buffer of messages.

The suggestions module 508 is further configured to keep track of the buffer of messages that were received from the messages module 506. In some instances, the buffer of messages can include the first message 120 and the second message 124 of FIG. 1. When a reminder is identified for generation, the suggestions module 508 can generate the suggestion UI element or it can request the suggestion UI element from the reminders module 514. In either case, this suggestion UI element can then be send back to the messages module 506 for presentation in the messaging app being used by the users. The suggestion UI being sent back the messages application is illustrated by arrow 522. Additionally, in some instances, the messages module 506 may ask the suggestions module 508 if the suggestions module 508 has any suggestions, illustrated by arrow 520.

As noted, the suggestions module 508 is configured with the machine learning model 510 and the decision engine 512. The model 510 may be a bidirectional machine learning model (e.g., a bidirectional Long Short Term Memory (LSTM) network model). In some examples, the model may be trained to detect ranges of text that are either action verbs or object cores. The action verb identifies the action that is to be taken (e.g., requested in the message) and the object core identifies the thing upon which the action is to be performed. As the model processes the message text, it annotates the ranges to identify which words of the message correspond to the action verb or the object core. The model can also detect the trigger (e.g., the time, the departure location, or the arrival location). This information can then be mapped into at least four different categories, including, but not limited to: home, work, school, and other. The model can then label these trigger locations as one of the categories, so that this information can be used to determine the reminder and/or the title of the reminder. Work, school, home, and LOI locations can be looked up in a user's account to determine the actual physical location (e.g., address or GPS coordinates) that corresponds to the category. Additionally, the model could detect an actual address in the text of the message, and use that address as the trigger location.

In some instances, the model may also annotate the text to identify whether it is a reminder statement or question. For example, the model can determine if the statement is just part of the conversation or if it is an actual request to perform an action (e.g., "can you pick up milk") or a suggestion to perform an action (e.g., "please pick up milk" or "don't forget to pick up milk"). This is important in order to disambiguate from statements like "I'm going to pick up milk" or "I picked up milk," so that a reminder is not generated for an action that does not need to be performed in the future. The model is also configured to identify a confirmation of the reminder statement. In some examples, the model can be trained with a plurality of examples, and then the message text is fed into the model. The model can also generate a title, by stitching the annotated portions of the message text together in a way that identify the reminder statement.

In some instances, classes that the model can infer include, but are not limited to: action verbs (e.g., based on a whitelist of action related verbs), object cores (e.g., nouns predicted by the model), location triggers (e.g., words that identify "leaving," or "entering" a location), locations (e.g., home, work, school, or other), due times (e.g., any future time detected by a data detector), and polarity (e.g., a reminder statement followed by acceptance, rejection, or no response (which can be considered a rejection)). In some instances, the model may be trained with a whitelist of verbs to enable the model to detect which words are indicative of actions that should be associated with a reminder. When detecting the due time, the model can disambiguate from multiple times that exist in a conversation. Generally, the second time will be selected as the due time. For example, in the message "I'm going to leave work at 4 pm, can you pick up the kids at 6 pm?" the model would determine that the due time for the reminder is 6 pm. These determinations identify the inferred ranges of the message text.

In some examples, the decision engine 512 can be leveraged to analyze the output of the model 510 (e.g., the inferred ranges) and construct the reminder object. Examples of decisions made by the decision engine 512 include, but are not limited to: ensuring that the date is in the future, ensuring that there is not more than one object core and action verb (e.g., this is validation of the object core and action verb), validating the LOIs, and validating that a reminder statement and a confirmation exists (e.g., polarity). Additionally, the decision engine 512 can be configured to stitch the inferred ranges together to form a title for the reminder object, validate the title, validate that the verbs are on the whitelist, and that the detected nouns are actually nouns. In one example, if the statement is "I'm making spaghetti tonight, can you pick up some sauce," the decision engine 512 can be configured to determine that the object core is "sauce" as opposed to "spaghetti." In some instances, if the decision engine 512 is unable to determine which of the two nouns is the object, the decision engine 512 may decide not to generate a reminder at all. Additionally, if the object core and the verb are seemingly out of order (e.g., "we are running out of milk, can you buy some time," the decision engine 512 could determine that the object is milk, even though the object came before the verb, and flip the terms in the title. In some examples, when certain text ranges (e.g., nouns, verbs, etc.) are missing, the decision engine 512 may not recommend a reminder at all. In yet another example, if the model detects multiple target dates, it may simply choose one (e.g., the second one or the one closest to the object in the sentence, as desired). However, in other examples, a threshold of accuracy may be determined, and potential reminders with ranges above the threshold would be generated, while potential reminders below the threshold would be ignored. For example, if two action verbs are detected, the threshold of accuracy would not be reached, and the reminder would not be generated/suggested. Additionally, in some examples, the model 510 may output the inferred ranges with respective confidence scores, and the engine may only analyze ranges above a threshold confidence score.

In some examples, once the decision engine determines to generate a reminder, a reminder suggestion UI element may be presented within the application that the user is interacting with (e.g., a messaging app that is being utilized for the conversation). This reminder suggestion UI element may be presented as soon as the user replies to the reminder statement with a confirmation. If the user accepts the suggestion, the reminder object can be forwarded to the reminders module 514, and the reminder UI element will be listed in a section of a reminders application that lists all accepted reminders. However, even if the user does not accept the reminder via the reminder suggestion UI element (e.g., they dismiss it or they just don't accept it), the reminder object may still be sent to the reminders module 514. In this case, instead of a reminder UI being displayed in the accepted reminders section, a reminder suggestion may be displayed in a separate section of the reminder application (e.g., a reminders suggestion UI section). However, in some examples, once the trigger expires (e.g., the trigger time passes, the departure location has been left, or the arrival location has been reached), the reminder suggestion will no longer be displayed in the reminder suggestion UI section, and the reminder object may be deleted. Further, unexpired reminder suggestions can be displayed to the user when they attempt to add a new reminder in the reminder application (e.g., via a new reminder addition UI section). In some examples, if the model detects two questions with only one confirmation, the decision engine could still generate the reminder, and ask the user during the reminder configuration to select one of the objects to be acted on. Similarly, if there is not trigger included in the reminder statement or the confirmation, the decision engine 512 could still generate the reminder, and ask the user when the reminder is due during the configuration stage.

In one implementation of the suggestions module 508, a pipeline is implemented, where information (e.g., messages and other message information) is processed. The suggestion module 508 can include one or more data dissectors, where the messages can be dissected for contact information (e.g., information that identifies the user of the message), event information, location information, trigger information, etc. In some instances, the suggestion module 508 can also include a reminder dissector that can hold the machine learning model and the decision engine. The reminder dissector can be located downstream in the pipeline from the other data dissectors. In this way, information that is extracted from the messages at an earlier dissectors can be reused by the reminder dissector. Thus, information that is detected by one or more data detectors does not need to be detected again. In some examples, a data detector is a software model or algorithm that is able to detect when a word in a message includes data that can be used by one or more other modules. For example, text that include dates, contact names, locations, etc., are all words that include valuable information. Thus, the data detector would be able to identify that, tag those words as including information, extract that information, and make that information available to other modules (e.g., the suggestions module 508 and/or the reminder dissector). Thus, when a message is analyzed by one or more data dissectors of the pipeline, to extract information from the words of the message, the reminder dissector can then go back to that data without having to re-analyze the words and re-extract the information, thus saving valuable processing cycles and even battery life of the user deice 504.

Additionally, in some examples, a separate application or module may be configured to detect dates and/or times in messages (e.g., using the data detectors), and generate one or more events from the date and/or time. These events can be generated for placement, storage, management, and/or presentation in a calendar application. In some instances, the reminder dissector may also be configured to analyze the text around the date to generate a title for the event. The title may be generated using the machine learning model of the reminder dissector sitting in the suggestions module 508. In this example, if the machine learning model 510 is not confident that the title is accurate, then no title will be sent to the event/calendar application. However, in this example, the machine learning model 510 may only validate that the title makes sense, as opposed to validating the other elements checked by the model for generating a reminder (e.g., the confirmation and the trigger).

Figure 6:
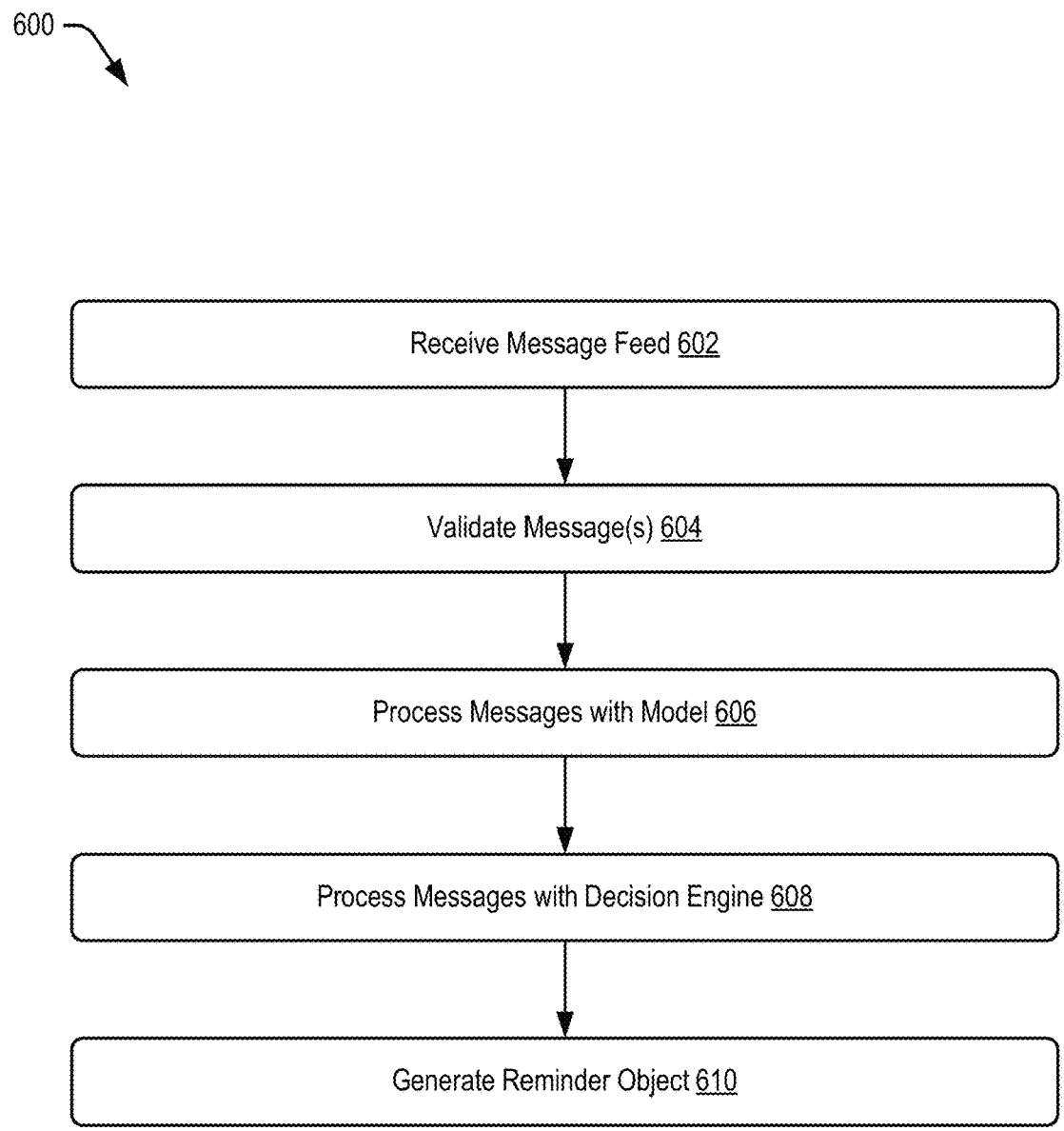
FIG. 6 is a flowchart illustrating an example process for generating reminders based at least in part on information identified in device applications, in accordance with at least one embodiment.
Figure 7:
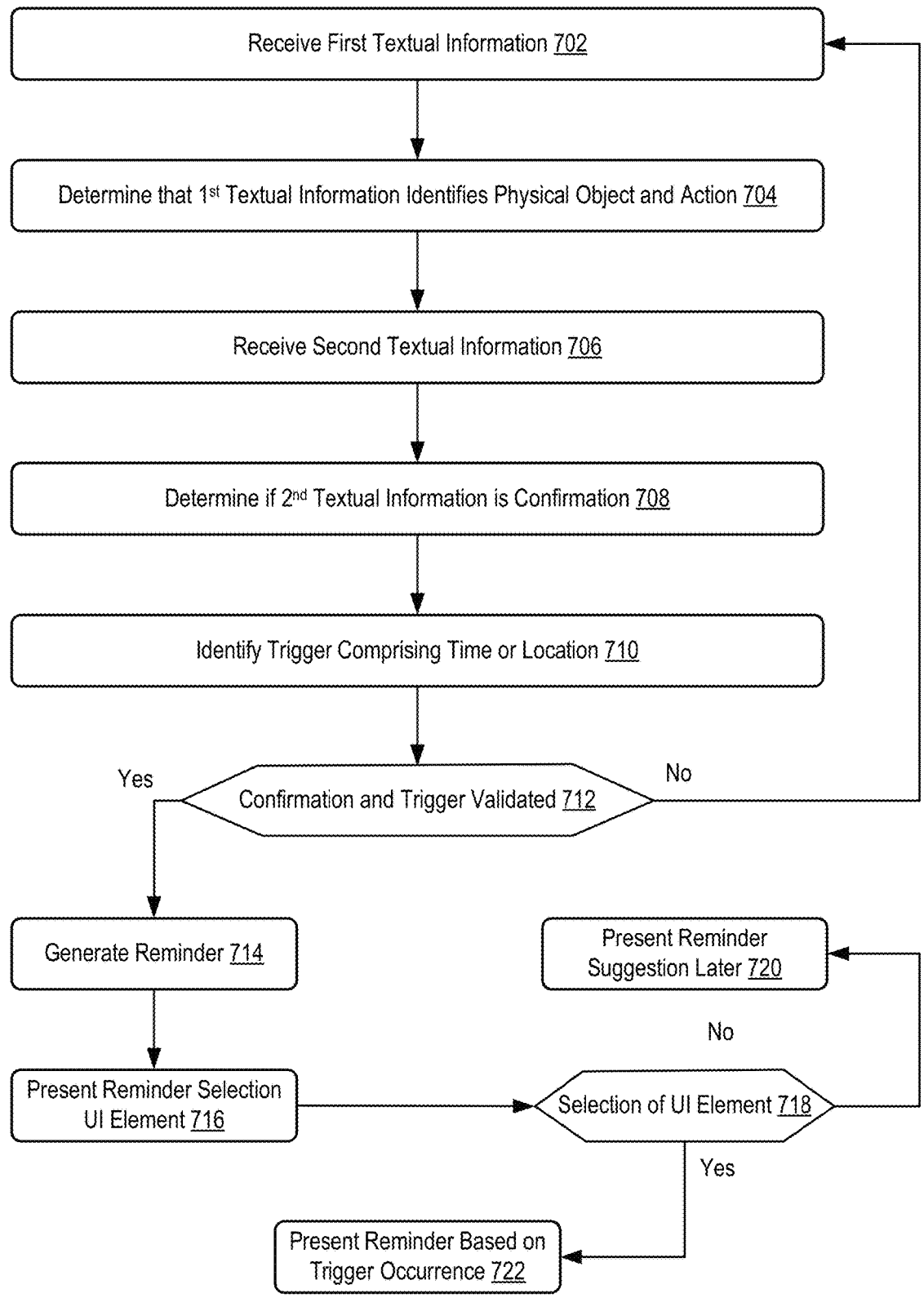
FIG. 7 is another flowchart illustrating an example process for generating reminders based at least in part on information identified in device applications, in accordance with at least one embodiment.
Figure 8:
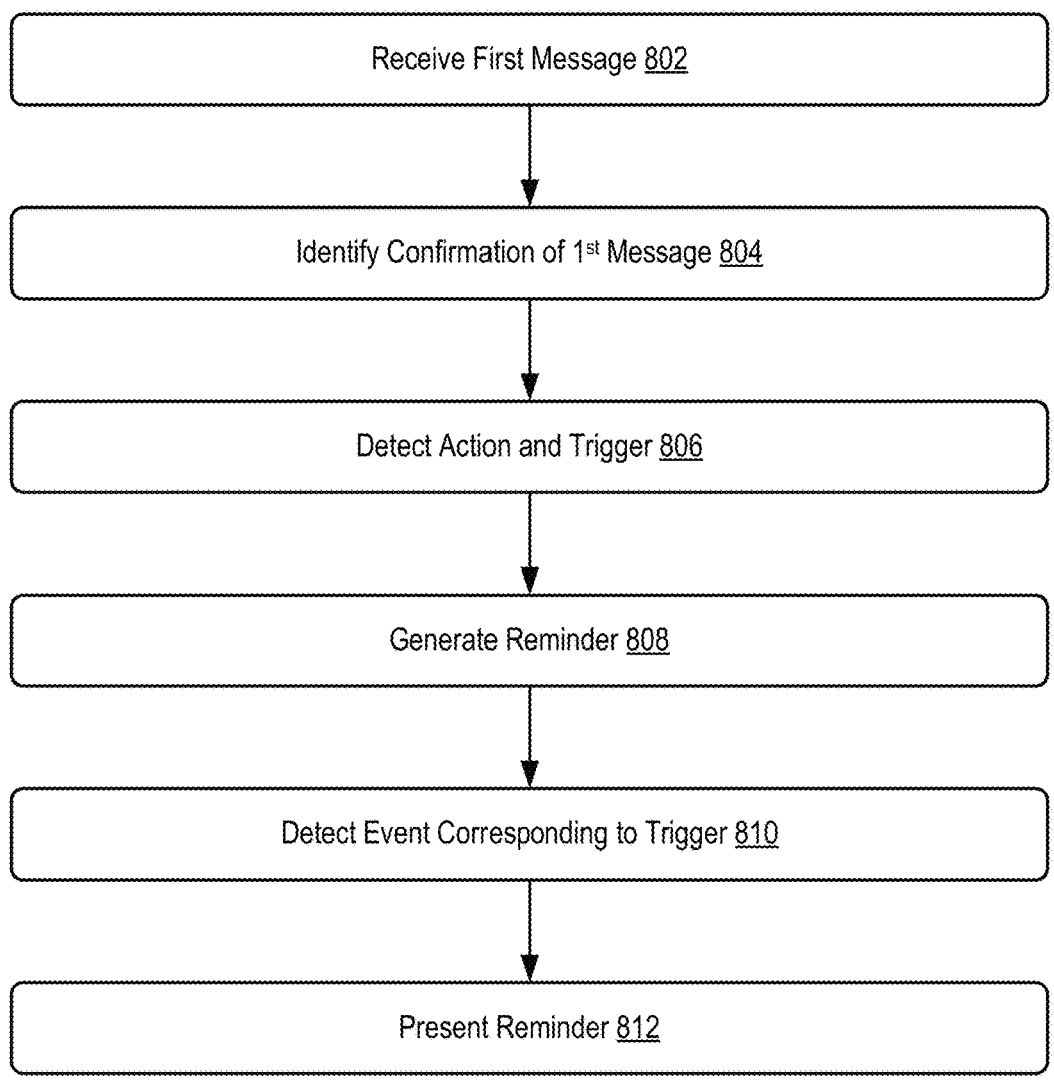
FIG. 8 is another flowchart illustrating an example process for generating reminders based at least in part on information identified in device applications, in accordance with at least one embodiment.

FIGS. 6-8 are flowcharts illustrating an example processes 600-800 for implementing aspects of techniques for generating reminders from applications, in accordance with at least one embodiment. The processes 600-800 may be performed by one or more components of the suggestions module 520 of FIG. 5 or the reminders/suggestions module 114 of FIG. 1. The processes 600-800 may performed in any suitable order. It should be appreciated that the processes 600-800 may include a greater number or a lesser number of operations than those depicted in FIGS. 6-8 and that the operations may be performed in any suitable order.

The process 600 may begin at 602, where a method (e.g., implemented by a suggestions module like suggestions module 508 of FIG. 5) can be configured to receive a message feed (e.g., from a messaging application like messages module 506 of FIG. 5). As an additional example, the conversation may be a voice/audio conversation using a cellular phone, and the messaging application may be the software used to transmit and receive audio signals between devices. In this example, the audio may be transcribed into text, and that transcribed text may be the conversation that is "received."

At 604, the suggestions module 508 may validate the message by checking for a few requirements. For example, the suggestions module 508 can determine whether the message is part of a group conversation, is in a supported language (e.g., English or some other language that the application is configured to handle), and is of an appropriate length. If any of these requirements are not met, the suggestions module 508 may decide not to process the message. Additionally, in some examples, the message may be processed as a small cache of text that includes just the previous message or two messages (e.g., one message from each of two users). The validation of this cache of text may include validating, using the following rules: the previous message must have come from another user (e.g., other than the account holder of the user device processing the message (e.g., the user of user device 502), the current message must have come from the account holder (e.g., the user of the user device 502), the previous message must have included a verb that matches a whitelist verb, the previous message must include a reminder statement (this step may be performed by a machine learning model like model 510 of FIG. 5), and the current message must include acceptation (e.g., confirmation of the reminder statement) (this step may also be performed by the model 510 of FIG. 5).

At 606, the model 510 may be configured to be run on a representation of the content. In some instances, the following operations can be performed on the validated text: lemmatize the content of the message text (e.g., sorting the words by grouping inflected or variant forms of same words together), run a Part-Of-Speech (POS) tagger on the content (e.g., read the text and assign parts of speech to each word, such as noun, verb, adjective, etc.), inject an action verb into the representation of the content, and inject a mapping to an emoji or other image that can represent text into the representation of the content. Once the representation has been generated, the model 510 can be run on the representation, and the output of the model 510 can be mapped to an output representation.

At 608, a decision engine (e.g., the decision engine 512 of FIG. 5 can be implemented to validate the model output. In some examples, the decision engine 512 can be configured to look at the model output for two messages, and stitch the results together. The decision engine 512 can also generate a title by finding the action verb and the object core, and combining them. Additionally, the decision engine 512 make sure the title contains a noun, resolve due dates (e.g., if there are more than one of the due date is in the past), resolve due locations, check if there is already a current reminder that matches the reminder being considered (e.g., to avoid duplicates, no reminder will be generated for the messages being processed if one already exists).

At 610, the process 600 can end when the decision engine generates the reminder and adds it to a list (e.g., "Found in Apps 516 of FIG. 5) that can be digested by a reminders application configured to manage and/or present a UI element for the reminder (e.g., the reminders module 514 of FIG. 5).

FIG. 7 is a flowchart illustrating another example process 700 for implementing aspects of techniques for generating reminders from applications, in accordance with at least one embodiment.

The process 700 may begin at 702, where first textual information may be received. The first textual information may be generated and received from a different user device operated by a different user than the user operating a user device executing the process 700.

At 704, the process 700 may determine that the first textual information identifies an object (e.g., a physical object) and an action to be performed on the object.

At 706, the process 700 may receive second textual information (e.g., a response to the first message). The second textual information may be received or otherwise identified based on input of the user of the operating the device implementing the process 700.

At 708, the process 700 may determine if the second textual information is a confirmation of the first textual information received at 702.

At 710, the process 700 may identify a target that comprises either a time or a location. The trigger may identify when the reminder is due (e.g., when the action is to be performed) and/or when the reminder should expire. In some examples, the existence of the trigger is a requirement for generation of the reminder.

At 712, the process 700 may determine whether the confirmation and the trigger are validated. For example, a decision engine (e.g., as described herein) may analyze the outputs of a machine learning model to validate whether the reminder should be generated. If the confirmation and trigger are not validated at 712, the process 700 may return to 702 to receive the next textual information. However, if the confirmation and trigger are validated, the process 700 may proceed to generate a reminder at 714. Generation of the reminder may include generating a reminder object that stores all the relevant details of the reminder, including the text ranges, tags, as well as the data associated with each text range (e.g., the trigger location information or the like).

At 716, a reminder selection UI element may be presented. The reminder selection UI element is also referred herein as a reminder suggestion. The reminder selection UI element can enable the user to accept or dismiss the reminder suggestion.

At 718, the process 700 may determine whether the reminder selection UI element was selected (e.g., whether the reminder suggestion was accepted). If not, the reminder suggestion may be presented later at 720, at least until it expires. However, if the reminder selection UI element is accepted at 718, the process 700 may present the reminder based at least in part on occurrence of the trigger (e.g., by providing an alert or notification that attempts to remind the use to perform the action on the object) at 722.

FIG. 8 is a flowchart illustrating another example process 800 for implementing aspects of techniques for generating reminders from applications, in accordance with at least one embodiment.

The process 800 may begin at 802, where a first message is received.

At 804, a confirmation of the first message is identified (e.g., from a second message).

At 806, an action and a trigger are detected from within the conversation that includes the first message and the confirmation.

At 808, a reminder can be generated based at least in part on an object, the action, and the trigger.

At 810, an event corresponding to the trigger is detected. For example, if the trigger is 6 pm, and the reminder is to be presented based at least in part on that occurring, then 6 pm is the event.

At 812, the process 800 may end when the reminder is presented based at least in part on detection of the event corresponding to the trigger.

As described above, one aspect of the present technology is the gathering and use of data available from various sources to generate reminders from applications. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, date of birth, or any other identifying or personal information.

The present disclosure recognizes that the use of such personal information data, in the present technology, can be used to the benefit of users. For example, the personal information data can be used to deliver better reminders. Accordingly, use of such personal information data enables users to receive reminders and/or notifications at a time and in a manner that may facilitate completion of a task. Thus, the personal information data discussed herein may aid the user in ensuring that a reminder is generated and/or the user is prompted to complete the task according the that particular user's schedule and daily activities.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of generating reminders from applications, the present technology can be configured to allow users to select to "opt in" or "opt out" of participation in the collection of personal information data (or some portion of their personal information data) during registration for services or anytime thereafter. In another example, users can select not to provide personal information data for the purposes of generating the reminders and/or notifications. In yet another example, users can select to limit the length of time personal information data is maintained or entirely prohibit the user of reminders and/or notifications that include or make use of the personal information. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, reminders may be generated and/or delivered by inferring preferences based on non-personal information data or a bare minimum amount of personal information, such as the content being requested by the device associated with a user, other non-personal information available to the proactive reminders engine, or publicly available information.

The specification and drawings are to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the techniques to be practiced otherwise than as specifically described herein. Accordingly, these techniques include all modifications and equivalents of the subject matter recited in the claims appended hereto as permitted by applicable law. Moreover, any combination of the above-described elements in all possible variations thereof is encompassed by the disclosed techniques unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A method, comprising:
   receiving, by a computing device, first textual information from a second computing device;
   determining, by the computing device, that the first textual information identifies an action to be performed;
   receiving, by the computing device, second textual information that is a response to the first textual information;
   determining, by the computing device, whether the response identifies a confirmation of the action to be performed;
   identifying, by the computing device, whether the first textual information or the second textual information identifies a first trigger; and
   in response to determining that the response identifies the confirmation of the action to be performed:
      storing, by the computing device, a reminder object corresponding to the action to be performed in a reminders application of the computing device;
      detecting a presence of a secondary trigger, the secondary trigger being determined based at least in part on the action and separate from the first trigger; and
      presenting, by the computing device, a reminder notification that represents the reminder object upon detection of the secondary trigger.

2. The method of claim 1, wherein the secondary trigger comprises an occurrence of a departure time for travel to a location at which the action is to be performed, the departure time based on a travel time.

3. The method of claim 1, further comprising generating a title for the reminder object based at least in part on at least one of the action or the first trigger, and wherein the reminder notification includes the title.

4. The method of claim 1, further comprising presenting the reminder object in at least one of a reminders user interface or based at least in part on a determined time, detection of the computing device leaving a location, detection of the computing device or a user arriving at the location, or detection of the computing device or a user being within a threshold distance of the second computing device or a second user.

5. The method of claim 1, further comprising validating the confirmation and the first trigger, wherein validating the confirmation and the first trigger comprises executing a decision engine to determine a confidence score for accuracy of the confirmation and the first trigger.

6. The method of claim 1, wherein the confirmation, the first trigger, and the action are determined based at least in part on a supervised machine learning model configured to analyze the first textual information and the second textual information.

7. The method of claim 1, wherein the secondary trigger is determined separate from first text corresponding to the first textual information and second text corresponding to the second textual information.

8. The method of claim 1, wherein the secondary trigger comprises an opportunity to complete the action.

9. The method of claim 1, wherein the secondary trigger comprises accessing a website where the action can be performed.

10. A user device, comprising:
    a memory configured to store computer-executable instructions; and
    a processor configured to access the memory and execute the computer-executable instructions to at least:
       receive a first message, from a second device, that identifies an action to be performed;
       identify a confirmation of the first message at the user device;
       detect, from at least one of the first message or the confirmation, information that identifies the action and a first trigger corresponding to the action;
       in response to identifying the confirmation and the action to be performed:
          store a reminder in a reminders application of the user device, the reminder generated based at least in part on the action and the first trigger;
          detect a presence of a secondary trigger, the secondary trigger being determined based at least in part on the action and separate from the first trigger; and
          present, on a display of the user device, a notification of the reminder corresponding to the action based at least in part on detection of the secondary trigger.

11. The user device of claim 10, wherein the notification is presented without further confirmation after receiving the confirmation of the first message.

12. The user device of claim 11, wherein the processor is further configured to execute the computer-executable instructions to at least present an acceptance prompt in a user interface of the display, and wherein the user interface comprises a plurality of other reminders of the reminders application.

13. The user device of claim 12, wherein the detection of the presence of the secondary trigger and the presentation of the notification are based at least in part on the storage of the reminder in the reminders application.

14. The user device of claim 12, wherein the plurality of other reminders comprise other unaccepted reminders.

15. The user device of claim 10, wherein the action is to be performed upon a physical object identified by the first message.

16. The user device of claim 10, wherein the secondary trigger identifies a time and date, an arrival location for the user device, or a departure location for the user device.

17. A non-transitory computer-readable medium, storing computer-executable instructions that, when executed by one or more processors of a user device, cause the one or more processors to perform operations comprising:
    receiving, by the user device, text of a digital conversation that identifies an action to be performed and a first trigger corresponding to the action;
    determining, based at least in part on the text, that at least a portion of the digital conversation comprises a confirmation;
    in response to determining that at least the portion of the digital conversation comprises the confirmation:
       storing a reminder in a reminders application of the user device, the reminder generated based at least in part on the action;
       detecting a presence of a secondary trigger, the secondary trigger being determined based at least in part on the action and separate from the first trigger; and
       presenting, on a display of the user device, a notification of the reminder corresponding to the action based at least in part on detection of the secondary trigger.

18. The non-transitory computer-readable medium of claim 17, wherein the reminder is generated further based at least in part on the action being identified on a whitelist of verbs.

19. The non-transitory computer-readable medium of claim 17, wherein the digital conversation is received via a messaging application of the user device.

20. The non-transitory computer-readable medium of claim 17, wherein the confirmation is determined by processing the text of the digital conversation using a machine learning model.

\* \* \* \* \*